United States Patent

Tems

[15] 3,652,974

[45] Mar. 28, 1972

[54] INTEGRATED CIRCUIT CARRIER

[72] Inventor: Adam Tems, Philadelphia, Pa.

[73] Assignee: Milross Controls, Inc., Southampton, Pa.

[22] Filed: Feb. 10, 1970

[21] Appl. No.: 9,683

[52] U.S. Cl. ..........................339/36, 174/DIG. 3, 206/65 F, 317/101 CP, 324/158 F, 339/17 CF, 339/174

[51] Int. Cl. ..................H01r 13/44, H01r 13/52, H05k 1/02

[58] Field of Search ................339/17, 75, 119, 276, 34, 174; 317/101 C, 101 CC, 101 CM, 101 CE; 174/DIG. 3, 68.5; 206/65 F, 8 B, 46; 324/158 F

[56] References Cited

UNITED STATES PATENTS

| | | | |
|---|---|---|---|
| 3,011,379 | 12/1961 | Corwin | 317/101 CP X |
| 3,124,248 | 3/1964 | Geoffrion et al. | 206/65 F X |
| 3,377,514 | 4/1968 | Ruehlemann et al. | 317/101 CC |
| 3,407,925 | 10/1968 | Ruehlemann | 317/101 CC |
| 3,409,861 | 11/1968 | Barnes et al. | 339/174 |
| 3,417,865 | 12/1968 | Suverkropp et al. | 317/101 CP |
| 3,529,277 | 9/1970 | Barnes | 339/119 R |

*Primary Examiner*—Marvin A. Champion
*Assistant Examiner*—Terrell P. Leurs
*Attorney*—Edelson & Udell

[57] ABSTRACT

A one-piece electronic or electrical component module carrier having two parallel widthwise extending beams of resilient material formed integrally with a base member and spaced apart a distance slightly greater than the length of the component module to form a central opening with beam carried retaining elements which overlie the component module once it has been located within the central opening and which prevent the component module from falling or being vibrated out of the central opening. The beams are spread for insertion of the component module therebetween, and as the beams resiliently return to their normal positions, the component module is held by the overlying retaining elements. The base member has a plurality of channels formed lengthwise therein to accommodate the leads of the component module and lead access apertures are provided at any desired location in the carrier body. Additionally, support shelves are provided or the beams carry shelf members to support the component module on its lower surface and thereby eliminate all bending stresses on the leads where they emerge from the body of the module. The underlying support shelves and overlying retainers capture the component module and hold it securely but in a generally unstressed state.

33 Claims, 21 Drawing Figures

INVENTOR.
ADAM TEMS

BY

Edelson and Udell
ATTORNEYS.

INVENTOR.
ADAM TEMS

BY

Edelson and Udell
ATTORNEYS.

INVENTOR.
ADAM TEMS
BY
Edelson and Udell
ATTORNEYS

INVENTOR
ADAM TEMS

BY

Edelson and Udell
ATTORNEYS.

INVENTOR.
ADAM TEMS
BY
Edelson and Udell
ATTORNEYS

INTEGRATED CIRCUIT CARRIER

This invention relates to an electronic or electrical component module carrier and more particularly to a one-piece carrier for supporting, holding and carrying standard component modules such as an integrated circuit package or modularized transformers, relays and the like. For purposes of illustration the invention is shown in the drawings and described in the specification as a carrier for an integrated circuit of the flatpack type.

As is well known, integrated circuit packages, i.e., the chip structure including the electrical leads connected thereto and the housing body which covers and protects the chip structure, are relatively small in physical size and are easily damaged in handling. Accordingly, during the steps of fabrication, testing, marking, and general handling, it has become the practice to place such a component module in a carrier. The carrier must be able to function in a number of ways: it should protect the integrated circuit from damage during normal handling; it should permit easy loading and unloading of the component module; it should permit easy access to the leads and to the integrated circuit housing per se so that the integrated circuit can be readily tested and marked; it should be able to withstand the rigors of a test program; it should be reusable; and in addition, it should be economical.

Heretofore, the carriers which have been employed to hold integrated circuits have not met all of the foregoing criteria. The carriers of the prior art have in the main included two-piece carriers in which the principal piece provides a means to support the integrated circuit and to accommodate the leads which extend therefrom while the other piece is secured with the principal piece over the integrated circuit to hold the latter therein. This arrangement has been unsatisfactory for a number of reasons. By employing the two-piece carrier certain areas of the integrated circuit module cannot be readily exposed for test purposes. Moreover, the two-piece carrier is more costly to tool and inventory than is a one-piece carrier, and does not lend itself to easy loading and unloading of integrated circuit modules thereby increasing handling costs.

The prior art also includes one-piece carriers, in one of which the base sections of certain of the grooves are extended into the aperture within which the integrated circuit is disposed, and these extensions are formed to provide step-like structures which support the integrated circuit on its lower surface. This type carrier has a number of undesirable aspects in that it has been found that the extensions of the groove structure are sufficiently tenuous that any repeated use causes the step structures to become fatigued and no longer act to support the integrated circuit module with sufficient reliability. Moreover, it has been found that this type of carrier inhibits the securing of test probes in close proximity to the integrated circuit module, and further, prevents bending, cutting, forming or tinning of the leads of the integrated circuit which is so often necessary. It has been further found with respect to this last-described prior art carrier that when the carrier mounted integrated circuit is subjected to vibration or heat the integrated circuit module can be vibrated out of or released from the carrier.

It is therefore an object of the present invention to provide an economical and reliable integrated circuit module carrier which will protect the integrated circuit module from damage due to normal handling.

A further object of the invention is to provide an integrated circuit carrier which will permit the integrated circuit module to be easily loaded into and unloaded from the carrier without imposing damaging stresses on the module, its leads and the regions where the leads emerge from the module body to thereby preclude destruction of encapsulation seals which would permit deleterious moisture penetration.

Another, object of the invention is to provide an integrated circuit module carrier which will permit easy access to the body of the integrated circuit as well as to the leads extending therefrom, for marking, forming, cutting, lead tinning and for test purposes while the module is in the carrier, and which is able to withstand rigorous testing and protect the integrated circuit during such handling.

The foregoing and other objects of the invention will be better understood from the following description in conjunction with the drawings, in which.

In the several figures, like elements are denoted by like reference characters.

Figure 1:
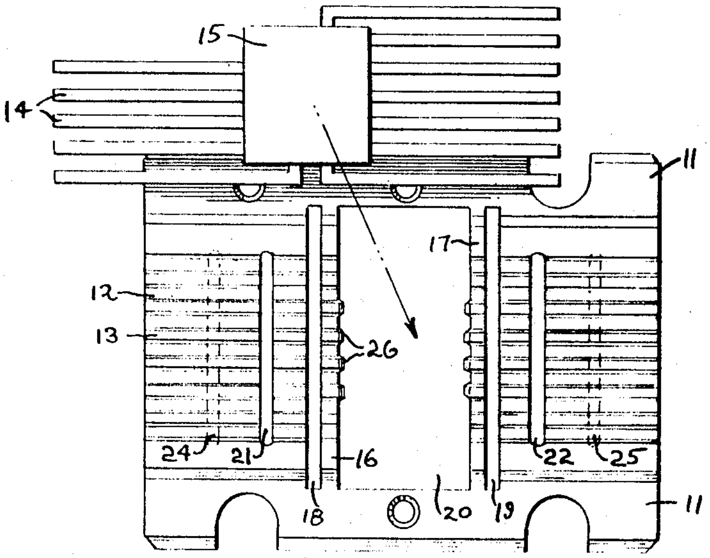
FIG. 1 is an exploded top plan view showing both a carrier according to the invention and an integrated circuit module of the flatpack type.
Figure 2:
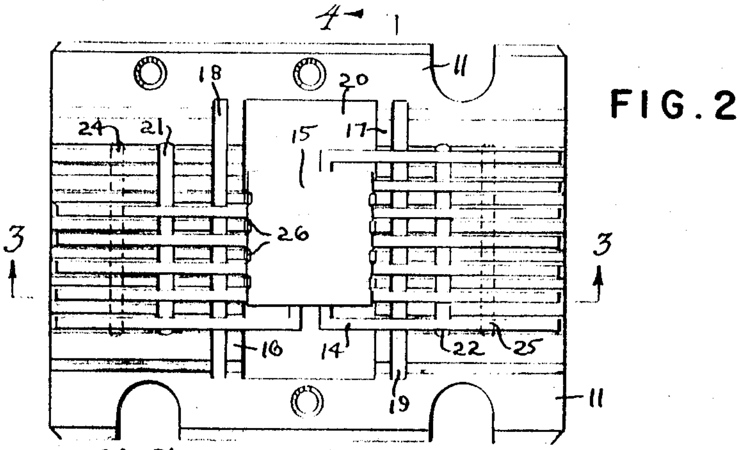
FIG. 2 is an assembled top plan view showing the integrated circuit disposed within the carrier.
Figure 4:
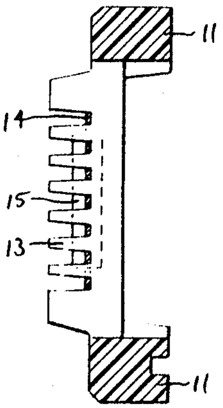
FIG. 4 is a cross-sectional view along the lines 4—4 of FIG. 2.

Briefly, all of the carriers according to the invention as illustrated in the drawings, and to be hereinafter described, are generally of flat rectangular shape having a central opening within which the body of the integrated circuit module is to be disposed with the leads thereof extending longitudinally in opposite directions lengthwise of the carrier body and disposed within channels or grooves formed in the upper surface of the carrier body. The central opening is bounded at its opposite longitudinally extending sides by the longitudinally extending side marginal portions of the carrier, and is bounded at its opposite widthwise extending sides by a pair of resilient or flexible beams spaced apart a distance just greater than the length of the body of an integrated circuit flatpack. The beams extend the width of the central opening and are anchored at their opposite ends to the carrier side marginal portions, the sides of the beams lying endwise outwardly from the central opening each defining one side of a widthwise extending slotlike beam accepting aperture into which the beams are outwardly deflected during insertion of a flatpack into the carrier, the other side of the slotlike beam accepting aperature being defined by a portion of the carrier body.

The width of the beam slots is such that the beams may be outwardly deflected sufficiently to permit entry of the module into the central opening, but is narrow enough to limit the beam deflection to prevent stressing the beams beyond their elastic limit during module insertion and withdrawal. Accordingly, the side of the slotlike beam accepting aperture defined by the carrier body functions as a beam stop means. Module overhang retainer projections are provided in all embodiments at the upper inner faces of the beams, these retainers preventing entry of a module into the central opening when the beams are not outwardly deflected and overlying the module after insertion of the latter to prevent escape. An underlying module support is also provided in the form of shelves in the preferred embodiments. The resilient return of the beams toward their undeflected positions produces a completely effective capture of the flatpack module between the overhang retainers and the underlying support.

At present, fairly wide dimensional tolerances exist in the electronics industry with respect to integrated circuit body sizes which renders many carriers unreliable as regards their ability to positively retain the module in the carrier. However, because the carriers according to the present invention utilize a capture principle rather than a pressure retention principle, the poor dimensional tolerances encountered do not constitute a problem.

The side marginal portions of the carrier are illustrated as provided with handling notches and apertures for use with automatic handling and testing apparatus in accordance with well known techniques and will not be particularly referred to in the following descriptions. The carriers may be made of any substantially rigid material providing the necessary resilience for the beams, such as suitable thermosetting or thermoplastic plastic materials. The various embodiments of the invention illustrate structural variants which are all within the purview of the basic concept of the invention.

Referring now to the drawings, and considering first FIGS. 1 to 5, there is shown a carrier of the kind just described with a body having longitudinally extending side marginal portions 11, an upper surface provided with a plurality of longitudinally extending channels 12 separated by walls 13 which accommodate leads 14 extending from integrated circuit flatpack 15, integrally formed widthwise extending beams 16 and 17, slots 18 and 19 immediately outwardly endwise of the beams, and central opening 20 within which the flatpack 15 is located. The beams 16 and 17 are formed with channel sections which align with the channels 12.

Figure 3:
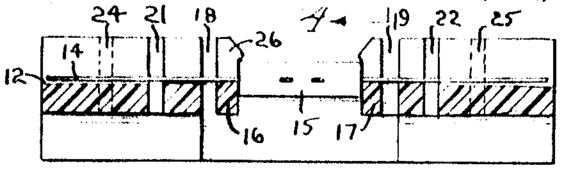
FIG. 3 is a longitudinal sectional view along the lines 3—3 of FIG. 2.
Figure 5:
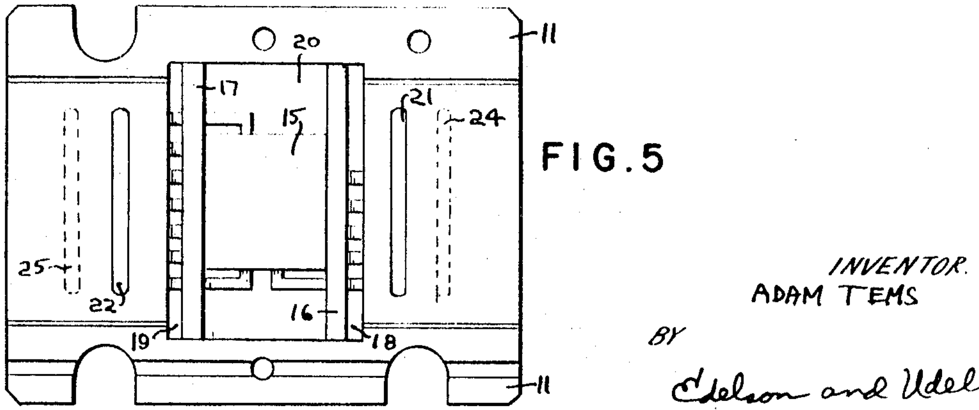
FIG. 5 is a bottom plan view of FIG. 2.

As previously noted, the integrated circuit module 15 is slightly shorter in length, (that is, the distance measured from left to right in FIG. 1) than the length of central opening 20 measured from left to right in FIG. 1. The facing sides of beams 16 and 17 are provided proximate to their upper edges with retainer projections 26 spaced apart lengthwise along the beams and overhanging the central opening 20. Beams 16 and 17 are spread or deflected into the slots 18 and 19 to permit the integrated circuit module 15 to be moved down into the opening 20, and when the integrated circuit 15 has passed downwardly toward the bottom of the carrier, and the beams 16 and 17 have resiliently returned to their normal undeflected positions the retainers 26 overhang the integrated circuit module 15 as best seen in FIG. 3. This arrangement keeps the integrated circuit 15 from falling out of the carrier in the event that the carrier should be turned upside down or in any way joggled, vibrated or subjected to impacts such as due to shipping, loading from vibratory feeders and the like.

Additionally the slots 18 and 19 also provide a means for securing test probes to the leads 14 which lie in the grooves 12 and pass across the slots 18 and 19. Such probes can be secured to the leads 14 through both the top and the bottom of slots 18 and 19. In this regard, it should also be noted that there are provided two additional slots 21 and 22 for connecting test probes to the leads 14 from either the top or the bottom of the carrier. As is well known, since the integrated circuit structure is miniaturized, it is sometimes difficult to locate probes side by side onto adjacent leads of an integrated circuit, and by providing the additional slots 21 and 22 probes may be secured to adjacent leads through different slots without having these probes interfere with one another or act to actually prevent one from being secured because the other overlaps the position. In this same regard it should be noted that two optional additional slots 24 and 25 are shown in phantom as illustrative of the addition of other slots as desired. All of these slots are also utilizable to clip the lead lengths if desired.

It has been found that with prior art one piece carriers which hold an integrated circuit, if the integrated circuit is subjected to vibration it "walks up" the side of the aperture within which it is located and is actually vibrated out of the carrier. The beam structure of the present invention with the overhand retainers eliminate the "walking up" phenomenon. However, the degree and frequency of vibration vary with the manufacturing processing and in-plant testing and accordingly, the retainers 26 provide a positive restraint against the undesired removal of an integrated circuit package in those circumstances when the characteristics of the vibrations are such that the "walking up" phenomenon is possible.

Figures 6, 7, 8, 9:
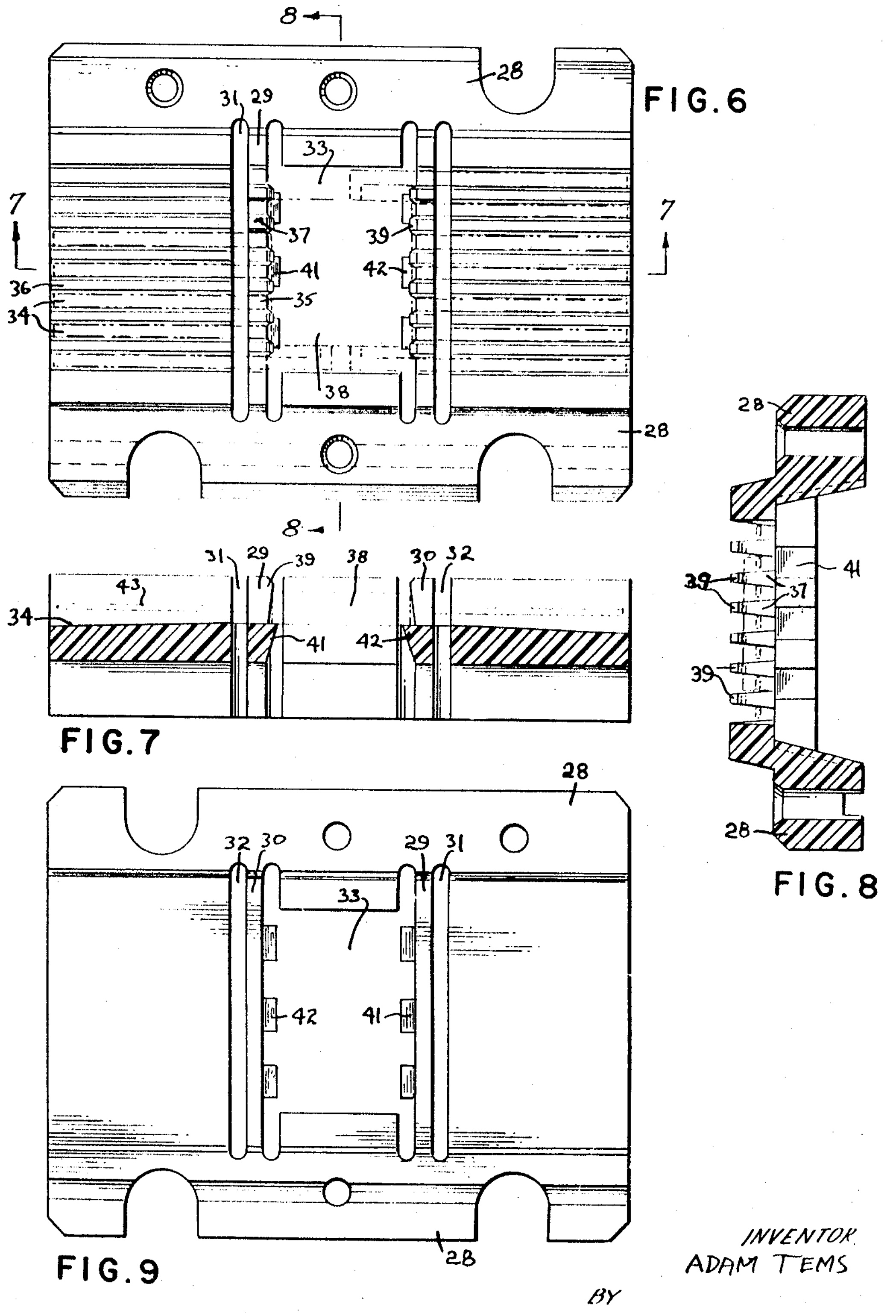
FIG. 6 is a top plan view of a second embodiment of the carrier according to the invention with the integrated circuit module shown in phantom.
FIG. 7 is a longitudinal sectional view along the lines 7—7 of FIG. 6.
FIG. 8 is a cross-sectional view along the lines 8—8 of FIG. 6.
FIG. 9 is a bottom plan view of the structure shown in FIG. 6.

FIG. 6 is a top plan view of a second embodiment of the present invention, the other views of which are seen in FIGS. 7 to 9. Carrier side margins 28 and beams 29 and 30, together with slots 31 and 32 and central opening 33 are formed and disposed in the same manner as previously described in connection with the embodiment of FIGS. 1 to 5. Formed in the carrier upper surface are a plurality of channels 34 having counterpart channels 35 formed in the beam members 29 and 30, the channels 34 and 35 being respectively separated one from the other by the ribs 36 and 37. The aperture 33 is slightly longer in its length as measured along the length of the carrier, i.e. along the dimension in FIG. 6 from left to right, than is the body of the integrated circuit module 38 which is shown in phantom located within the aperture 33.

As best seen in FIG. 7, the beam structures 29 and 30 are formed with upper retainers 39 and 40 and lower shelf projections 41 and 42. As was true with the structure shown in FIG. 1, the retainers 39 and 40 overhang the integrated circuit module body once it has been inserted into the central aperture 33 so that it cannot be vibrated out of the opening 33, nor can it be dropped out if the carrier should be turned upside down.

The lower shelf projections 41 and 42 have their upper surfaces at the same elevation as the upper surfaces of channels 34 and 35, and support the integrated circuit 37 on its lower surface, thereby completely capturing and locking the integrated circuit package between the lower shelves 41 and 42 and upper retainers 39 and 40. In accordance with this arrangement the leads 43 which extend from the integrated circuit module do not come in contact with the bottoms of the channels 34, thereby eliminating all bending stresses on the leads where they emerge from the body of the flatpack and the bottoms of the channels 34 are tapered downward toward the outer extremities of the carrier.

FIGS. 10 through 13 depict a third embodiment of the invention in which the carrier side margins 45 are formed integrally with two beams 46 and 47, and spaced outwardly endwise from the beams 46 and 47 are slots 48 and 49, and inwardly between the beams is a central opening 50. The beams 46 and 47 are deflected into slots 48 and 49 when the integrated circuit module is placed between the beams as described in connection with the structures of FIGS. 1 and 6. The facing sides of beams 46 and 47 are provided with a plurality of retainer projections 53 at their upper edges spaced apart lengthwise along the beams and overhanging the central opening 50 which positively lock the integrated circuit body within the aperture 50 when it has been placed therein. A pair of elongated shelf members 51 and 52 extend toward one another from the opposite side margins 45 of the carrier into the central opening 50 between the beams 46 and 47 and upon which the body of the integrated circuit module seats when inserted into the central opening 50, as shown in phantom in FIGS. 10 and 11.

Figures 10, 11:
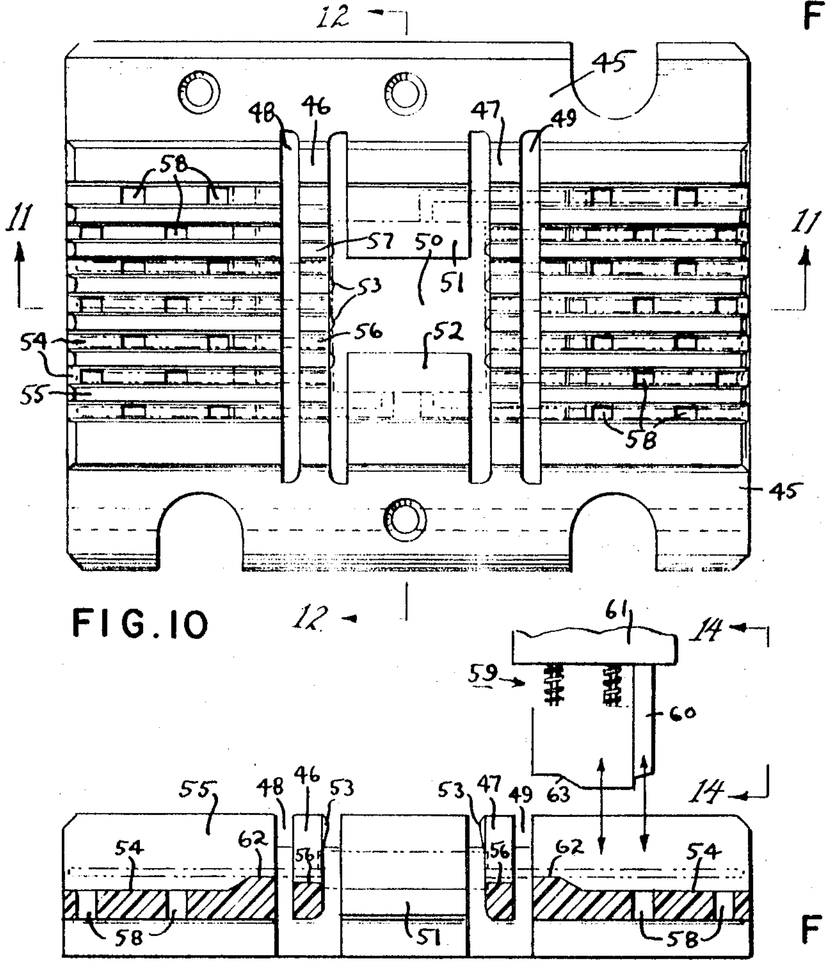
FIG. 10 is a top plan view of a third embodiment of the invention.
FIG. 11 is a longitudinal sectional view along the lines 11—11 of FIG. 10 with a front view of a lead cutter shown.
Figure 12:
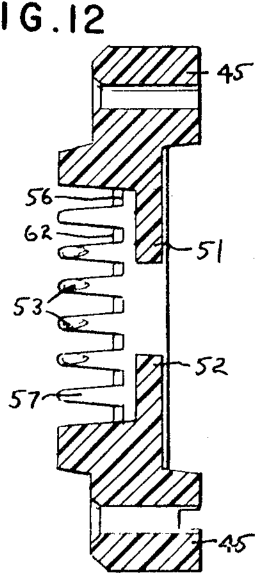
FIG. 12 is a cross-sectional view of the structure of FIG. 10 taken along the lines 12—12.

In FIG. 10 there are also shown channels 54, as well as the ribs 55 which separate these channels, and as described earlier, the channels are for the purpose of locating and protecting the leads which extend from the integrated circuit body. As was true with the structures of FIG. 1 and 6, the beams 46 and 47 also have aligned channels 56 separated by the ribs 57, as best seen in FIG. 12, and it should be noted that the leads of the integrated circuit clear these beam channel bottoms.

Additionally shown are a plurality of rectangular windows 58 disposed in a staggered arrangement in the channels 54 and passing completely through to the other side of the carrier. The windows 58 enable test probes to be readily attached at different locations along the leads extending from the integrated circuit body without interference with other rest probes, and in addition permit the fitting of such test probes from the bottom of the carrier. Window as illustrated or of other shapes, as well as the slots shown in FIG. 1 may of course be utilized with all embodiments of the invention,. Further, the windows 58 enable the leads to be cut at various locations with a cutting device, such as the cutting device 59, which is shown in FIG. 11.

Figure 14:
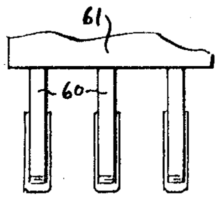
FIG. 14 is a side view of the lead cutter shown in FIG. 11.
Figure 13:
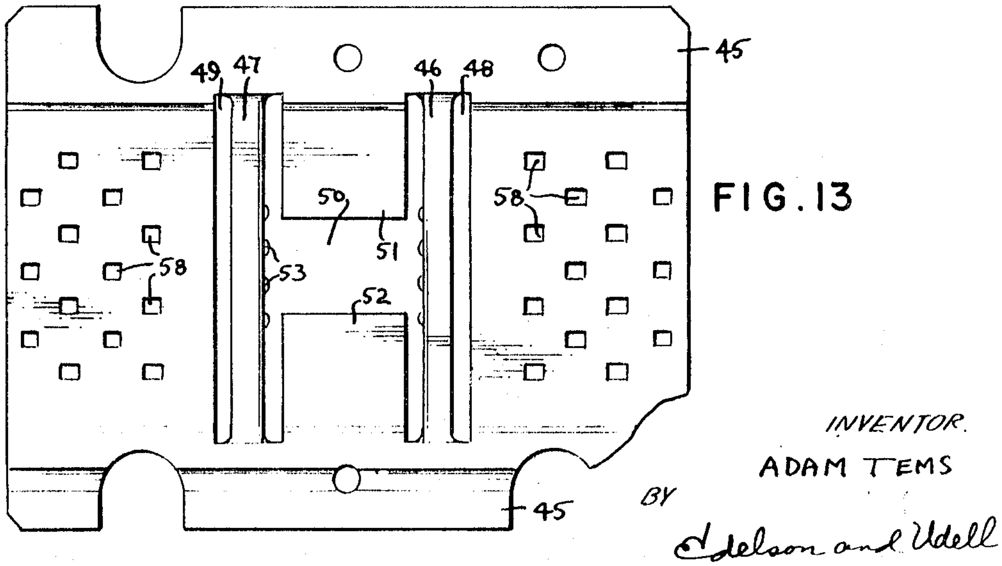
FIG. 13 is a bottom plan view of the structures shown in FIG. 10.

The cutting device 59 as seen from FIGS. 11 and 14 is a spring loaded mechanism which has a knife member 60 located at its front edge. In use, the cutting device 59 is positioned where the knife element can pass through one of the selected windows 58, and the plunger 61, is forced downward to cause the knife to cut off the lead by passing through the lead and through the selected window. In this way the carrier body functions as a cutting die and the leads of the integrated circuit can be terminated in any of the positions shown by the windows 58. As shown, the cutting device illustrated in FIGS. 11 and 14 is a three position cutter, although a cutter for any number of positions can readily be provided for use with the structures shown in FIGS. 10 to 13.

When a lead cutting operation is desired it is of course necessary to clamp the lead in a manner which minimizes the imposition of stresses. This is accomplished as best seen in FIG. 11 by providing an elevated portion 62 of each channel 54 adjacent to the slots 48 and 49 to immediately underlie the integrated circuit leads and act as a forming die for the complementally shaped undersurface 63 of the cutter 59, clamping occurring before cutting. As shown, a downward offset is also formed in the leads although such forming is optional. Other types of lead forming and cutting can of course also be effected without the necessity for removal of the flatpack from its carrier, thereby minimizing handling operations, cost and probability of damage.

Figure 15:
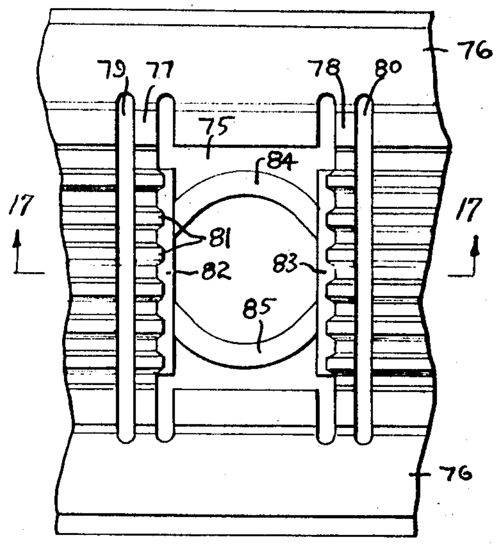
FIG. 15 is a fragmentary top plan view of the central region of a fourth embodiment of the invention.
Figure 16:
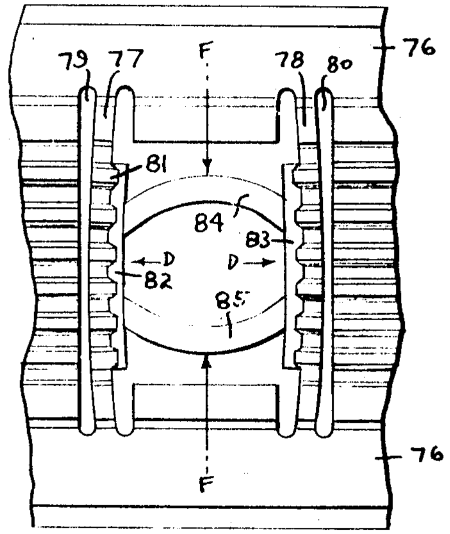
FIG. 16 depicts the structure shown in FIG. 15 but wherein the beams have been moved apart by virtue of the forces shown.
Figure 17:
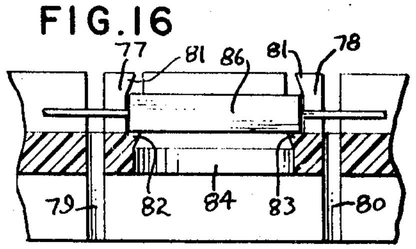
FIG. 17 is a longitudinal sectional view of the structure shown in FIG. 15 taken along the lines 17—17.

FIGS. 15 to 17 show a fourth embodiment of the present invention in which the carrier side margins 76 are formed integrally with retaining beams 77 and 78, and spaced outwardly endwise from the beams 77 and 78 and slots 79 and 80, and inwardly between the beams is the central opening 75 within which the integrated circuit module is to be disposed.

The beam members 77 and 78 each have a plurality of retainer protrusions 81 formed at their upper edges which act as those previously described to positively retain the integrated circuit module once it has been inserted between the beams 77 and 78. In addition, each of the beams 77 and 78 is provided with a shelf, designated respectively is 82 and 83, formed thereon, downwardly spaced from the retainers 81, which shelves are jointed together by a pair of substantially circular arcuate segments 84 and 85. The integrated circuit body is inserted into the central opening 75 between the retention beams 77 and 78 by forcing the segments 84 and 85 inwardly toward one another at their centers, as shown by the vectors F—F in FIG. 16, so that the beams 77 and 78 are bowed outward in the direction shown in FIG. 16 by arrows D—D. In this way the space between the beams 77 and 78 is widened, thereby permitting easy insertion of the integrated circuit body 86 (shown in FIG. 17). When the arcuate segments 84 and 85 are released, the beams 77 and 78 return to their original positions and thereby capture the integrated circuit module between the retainers 81 and shelves 82 and 83 in the now well known manner. The open region between the arcuate segments 84 and 85 permits access for marking of the bottom surface of the integrated circuit body.

Figures 18, 19, 20, 21:
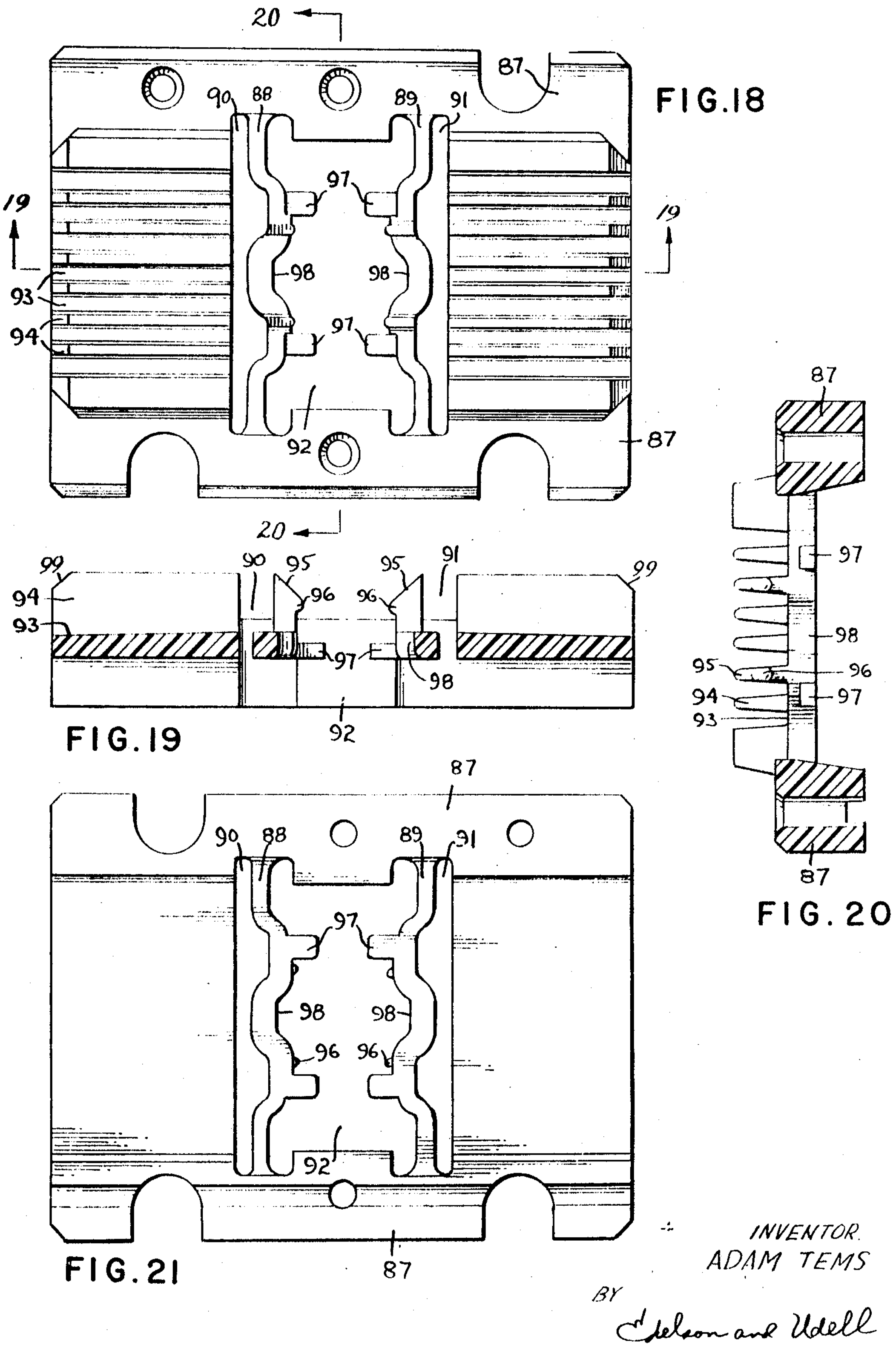
FIG. 18 is a top plan view of another embodiment of carrier according to the invention.
FIG. 19 is a longitudinal sectional view along the lines 19—19 of FIG. 18.
FIG. 20 is a cross-sectional view along the lines 20-20 of FIG. 18.
FIG. 21 is a bottom plan view of the carrier shown in FIG. 18.

FIG. 18 is a top plan view of another and preferred embodiment of the present invention, the other views of which are seen in FIGS. 19 to 21. Carrier side margins 87 and beams 88 and 89, together with slots 90 and 91 and central opening 92 are disposed in the same manner as previously described in connection with the previous embodiments, the beam shape being somewhat different as will be hereinafter described. Formed in the carrier upper surface are a plurality of downwardly sloped integrated circuit lead receiving channels 93 separated one from the other by the walls 94. As with the previous embodiments the aperture 92 is slightly longer in length as measured along the length of the carrier than is the body of the integrated circuit module to be disposed therein.

As best seen in FIG. 19, the beam structures 88 and 89 are formed with sloping upper camming surfaces 95, upper retainers 96, and lower shelf projections 97. As was true with the previously described structures the retainers 96 overhang the integrated circuit body once it has been inserted into the central aperture 92 by lateral displacement and return of the beams 88 and 89 so that it cannot be vibrated out nor be dropped out if the carrier should be turned upside down. The lower shelf projections 97 support the integrated circuit on its lower surface and lock the integrated circuit module between the lower shelves 97 and upper retainers 96. The elevation of the shelves is such that the leads which extend from the integrated circuit body do not come in contact with the bottoms of the channels 93, thereby eliminating all bending stresses on the leads where they emerge from the body of the flatpack.

The beams 88 and 89 are observed as shown in a convoluted form, and this is a consequence of the fact that it is desirable to fix the separation of the beams in their central region 98 so that a standardized expanding tool may be inserted into the carrier central opening 92 from below and engage the beam regions 98 to move them laterally outward at the time that a flatpack is being inserted into the carrier. Since flat packs are made in various standard sizes of different body length as measured longitudinally of the carrier, the spacing between the beams 88 and 89 must be different for the different size integrated circuits which are to be disposed in the carrier.

For example, one size of carrier according to the invention will accept and properly hold flatpack bodies having lengths from 0.240 to 0.27 inch, the nominal one forth inch size, while a second carrier covers the range from 0.170 to 0.200 inch the nominal three sixteenth inch size, and a third carrier covers the range from 0.140 to 0.170 inch, the nominal one eighths size, all such carriers having a 0.030 inch tolerance range. Additionally, all of these carriers will accommodate flatpack thicknesses from 0.035 to 0.70 inch.

However, even though the beam spacing must vary at the module capture regions, it is highly desirable that the same insertion and extraction apparatus be usable with all such carriers, and accordingly the beam spacing at the central regions 98 is held constant regardless of the beam spacing at the regions of the retainers and shelves. The beam form illustrated is for use with the small size of integrated circuit module, the beams becoming progressively straighter for the larger sized module bodies as the overhang retainer regions of the beams and the shelves 97 are disposed to a greater extent laterally outwardly.

As best seen in FIG. 19 the upper outer ends of the ribs 94 are chamfered as at 99 to provide a smooth lead-in feature without the occurrence of hang-up due to vertical or skew misalignment of stacked carriers which would prevent automatic feed of the carriers from a stack.

What is claimed to be new and useful is:

1. A carrier device for holding an electronic component module of the type having leads extending therefrom, comprising in combination, a body having upper and lower surfaces and a module body-receiving opening extending completely through said carrier body between said upper and lower surfaces and having spaced apart longitudinally extending and spaced apart widthwise extending bounding edges, said body-receiving opening being defined along either its longitudinally or widthwise extending edges by opposite marginal portions of said carrier body and being defined along the remaining of its longitudinally and widthwise extending edges by the inwardly facing sides of a pair of resilient beams carried by said carrier body, said beams inwardly facing sides being spaced apart a distance sufficient to accommodate therebetween the body of the module to be received in said body-receiving opening, said beams each also having an outwardly facing side lying away from said body-receiving opening and defining an edge of a beam accepting aperture, component module retainer means partially closing the entrance to said body-receiving opening to a size effective to prevent passage of a module, said retainer means by outward deflection of said beams into said beam accepting apertures being shiftable to permit passage of a module body into said body-receiving opening and being thereafter returnable to the passage preventing position when said beams resiliently return to their undeflected positions.

2. A carrier as defined in claim 1 wherein said beams are formed integrally with said carrier body and are joined thereto at least at one point.

3. A carrier as defined in claim 1 wherein said beams are formed integrally with said carrier body and are joined to the latter at opposite ends of said beams.

4. A carrier as defined in claim 1 wherein said beams are formed integrally with said carrier body and are joined thereto at least at one point, said beam accepting apertures being in the shape of elongated slots extending the full length of each of said beams.

5. A carrier as defined in claim 1 wherein said body-receiving opening is defined along its longitudinally extending edges by the opposite longitudinally extending side marginal portions of said carrier body and is defined along its widthwise extending edges by said inwardly facing sides of said pair of resilient beams, said resilient beams and beam accepting apertures adjacent thereto extending widthwise of said carrier.

6. A carrier as defined in claim 1 wherein said beams are formed integrally with said carrier body and are joined thereto at least at one point, and wherein said body-receiving opening is defined along its longitudinally extending edges by the opposite longitudinally extending side marginal portions of said carrier body and is defined along its widthwise extending edges by said inwardly facing sides of said pair of resilient beams, said resilient beams and beam accepting apertures adjacent thereto extending widthwise of said carrier.

7. A carrier as defined in claim 1 further including at least one additional aperture through the carrier body spaced longitudinally endwise of said body-receiving opening, said additional aperture registering with at least one lead of a component module installed in said carrier, whereby such lead may be mechanically worked and electrically engaged.

8. A carrier as defined in claim 7 wherein said at least one additional aperture through the carrier body comprises a plurality of spaced apart holes.

9. A carrier as defined in claim 7 wherein said at least one additional aperture through the carrier body comprises a slot extending intersectingly transverse to a group of component module leads.

10. A carrier as defined in claim 1 wherein said beams are formed integrally with said carrier body and are joined thereto at least at one point, and wherein said body-receiving opening is defined along its longitudinally extending edges by the opposite longitudinally extending side marginal portions of said carrier body and is defined along its widthwise extending edges by said inwardly facing sides of said pair of resilient beams, said resilient beams and beam accepting apertures adjacent thereto extending widthwise of said carrier, said carrier further including at least one additional aperture through the carrier body spaced longitudinally endwise of said body-receiving opening, said additional aperture registering with at least one lead of a component module installed in said carrier, whereby such lead may be mechanically worked and electrically engaged.

11. A carrier as defined in claim 1 further including component module body support means engaged by and operative to support the body of a component module inserted into said carrier body-receiving opening while maintaining the module leads free of body supporting engagement with said carrier.

12. A carrier as defined in claim 1 wherein said beams are formed integrally with said carrier body and are joined thereto at least at one point, and wherein said body-receiving opening is defined along its longitudinally extending edges by the opposite longitudinally extending side marginal portions of said carrier body and is defined along its widthwise extending edges by said inwardly facing sides of said pair of resilient beams, said resilient beams and beam accepting apertures adjacent thereto extending widthwise of said carrier, said carrier further including at least one additional aperture through the carrier body spaced longitudinally endwise of said body-receiving opening, said additional aperture registering with at least one lead of a component module installed in said carrier, whereby such lead may be mechanically worked and electrically engaged, and wherein said carrier further includes component module body support means engaged by and operative to support the body of a component module inserted into said carrier body-receiving opening while maintaining the module leads free of body supporting engagement with said carrier.

13. A carrier as defined in claim 1 further including beam spreading means carried by said beams and effective when operated to spread said beams and permit easy entry of a component module body into said body-receiving opening in said carrier.

14. A carrier as defined in claim 1 wherein said retainer means comprises means carried by at least one of said resilient beams.

15. A carrier as defined in claim 1 wherein said retainer means is integral with and shiftable with at least one of said resilient beams.

16. A carrier as defined in claim 1 wherein said retainer means is integral with and shiftable with at least one of said resilient beams and extends inwardly into said body-receiving opening from the inwardly facing side of said at least one beam and is positioned so as to overlie a portion of the upper surface of a component module body installed in said carrier.

17. A carrier as defined in claim 1 wherein said beams inwardly facing sides are spaced apart a distance slightly greater than the length of the body of the module to be received in said body-receiving opening.

18. A carrier as defined in claim 1 wherein the leads from an electronic component module are adapted to extend across at least one of said upper and lower carrier body surfaces, which surface is configured to function as a forming die for the module leads.

19. A carrier as defined in claim 1 further including beam stop means positioned to engage said beams and prevent deflection thereof beyond the elastic limit of said beams when the latter have been deflected to a predetermined extent.

20. A carrier as defined in claim 11 wherein said component module body support means comprises underlying shelf means upon which the component module body seats.

21. A carrier as defined in claim 11 wherein said component module body support means comprises underlying shelf means upon which the component module body seats, said shelf means being carried by at least one of said beams.

22. A carrier as defined in claim 11 wherein said component module body support means comprises underlying shelf means upon which the component module body seats, said shelf means being carried by at least one of said marginal portions of said carrier body and extending therefrom into said body-receiving opening.

23. A carrier as defined in claim 11 wherein said component module body support means comprises underlying shelf means upon which the component module body seats, and said retainer means comprises means carried by at least one of said resilient beams.

24. A carrier as defined in claim 11 wherein said component module body support means comprises underlying shelf means upon which the component module body seats, said shelf means being carried by at least one of said marginal portions of said carrier body and extending therefrom into said body-receiving opening, and wherein said retainer means comprises means carried by at least one of said resilient beams.

25. A carrier as defined in claim 11 wherein said component module body support means comprises underlying shelf means upon which the component module body seats, said shelf means being carried by at least one of said beams, and wherein said retainer means is integral with and shiftable with at least one of said resilient beams and extends inwardly into said body-receiving opening from the inwardly facing side of said at least one beam and is positioned so as to overlie a portion of the upper surface of a component module body installed in said carrier.

26. A carrier as defined in claim 25 further including beam spreading means carried by said beams and effective when operated to spread said beams and permit easy entry of a component module into said body-receiving opening in said carrier.

27. A carrier device for holding an electronic component module comprising in combination, a main body member having opposed top and bottom surfaces, said body member being apertured to provide therein a central opening extending completely therethrough from the top to the bottom surfaces thereof and a pair of elongated slots respectively spaced outwardly from one pair of opposite sides of said central opening, said slots forming conjointly with said central opening a pair of flexible beams each having at least one end thereof joined to said carrier body, and vertically spaced upper and lower retaining means which project into the area of said central opening adapted respectively to overhang at least a part of the top surface of an electronic component module positioned in said central opening for preventing unintentional upward displacement of said module from between said beams and to underlie at least a part of the bottom surface of said module for supporting the same in position between said beams, said beams each having a flexing capability sufficient to allow the component module to be inserted substantially flatwise downwardly into said central opening past said upper retaining means and into seated engagement with said lower retaining means.

28. A carrier device as defined in claim 27 wherein said vertically spaced means are all formed as integral elements of said beams.

29. A carrier device as defined in claim 27 wherein said upper retaining means are all formed as integral elements of said beams.

30. A carrier device as defined in claim 27 wherein said lower retaining means are in the form of coplanar platforms extending into the area of said central opening for seating of the component module thereon.

31. A carrier device as defined in claim 27 wherein said lower retaining means are formed as integral elements of said carrier body independent of and apart from said beams.

32. A carrier device as defined in claim 27 wherein said lower retaining means are in the form of opposed coplanar platforms which project into the area of said central opening between and in spaced relation to said beams.

33. A carrier device for holding an electronic component module of the type having a module body and leads extending therefrom, comprising in combination, a carrier device body having upper and lower surfaces and a module body-receiving opening extending completely through said carrier body between said upper and lower surfaces and having spaced apart longitudinally extending and spaced apart widthwise extending bounding edges, said body-receiving opening being defined along either its longitudinally or widthwise extending edges by opposite marginal portions of said carrier body and being defined along the remaining of its longitudinally and widthwise extending edges by the inwardly facing sides of a pair of resilient beams carried by said carrier body, said beams inwardly facing sides being spaced apart a distance sufficient to accommodate therebetween the body of the module to be received in said body-receiving opening, said beams each also having an outwardly facing side lying away from said body-receiving opening and defining an edge of a beam accepting aperture, component module retainer means partially closing the entrance to said body-receiving opening to a size effective to prevent passage of a module body, said retainer means by outward deflection of said beams into said beam accepting apertures being shiftable to permit passage of a module body into said body-receiving opening and being thereafter returnable to the passage preventing position when said beams resiliently return to their undeflected positions.

* * * * *